US006302597B1

(12) United States Patent
Chang et al.

(10) Patent No.: US 6,302,597 B1
(45) Date of Patent: Oct. 16, 2001

(54) HIDDEN VIEWFINDER FOR CAMERA

(75) Inventors: Guang-Shang Chang, TaiChung; Chien-Chin Chan, ChuPei; Chien-Ming Peng, Hsinchu, all of (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 09/461,348

(22) Filed: Dec. 15, 1999

(51) Int. Cl.[7] .......... G03B 13/02
(52) U.S. Cl. .......... 393/373
(58) Field of Search .......... 396/373, 383, 396/378, 381

(56) References Cited

U.S. PATENT DOCUMENTS 1,494,188 * 5/1924 Rollins .......... 396/373
4,032,940 * 6/1977 Chan .......... 396/383
4,283,132 * 8/1981 Engelsmann et al. .......... 396/383
5,005,032 * 4/1991 Burnham .......... 396/373
5,146,253 * 9/1992 Swayze .......... 396/373
5,848,302 * 12/1998 Machida .......... 396/60

* cited by examiner

*Primary Examiner*—Christopher E. Mahoney
(74) *Attorney, Agent, or Firm*—Dougherty & Troxell

(57) ABSTRACT

A hidden viewfinder for camera includes a camera body having a pair of spaced channel slots, a plurality of lens frames each having a bottom end pivotally hinged on the camera body between the channel slots and a reversed U-shaped tunnel type outer frame having a top wall and two side walls engageable with the channel slots. There is a torsional spring engaged with the bottom end of each lens frame. When the outer frame is pressed down and held in the channel slots, the top wall will press the lens frames to turn about the bottom ends for the lens frames laying horizontally on the camera body to form a compact size camera. When in use, the outer frame is raised above the camera body, the torsional springs will raise the lens frames upright to form the viewfinder in the outer frame. Circuit boards and control elements may be placed in the camera body between the channel slots for the camera because compact size but rich in function.

8 Claims, 9 Drawing Sheets

HIDDEN VIEWFINDER FOR CAMERA

BACKGROUND OF THE INVENTION

1. Field of the Invention

This invention relates to a hidden viewfinder for camera and particularly to a camera which may hide a viewfinder in the camera body.

2. Description of the Prior Art

A conventional camera 10 (as shown in FIG. 1) usually includes a camera lens 12 and a viewfinder 14. The camera lens 12 is for capturing outside picture to expose negative film loaded in the camera. The viewfinder 14 is a window for the photographer to view the outside picture for composing a photo desired. The viewfinder 14 usually is a rectangular tunnel like structure which includes a plurality of lenses 142. It is generally fixed in the camera 10. The tunnel type structure occupies a relatively large space in the camera to form a free optical path to capture outside picture for image taking. Apart from holding the lenses 142, it cannot be used for other purpose.

However contemporary camera design concept and trend is heavily focusing on compact size for user convenience. How to shrink the camera size without compromising its function becomes a big design issue. The viewfinder takes a lot of space but serves only limited function part of the time. It is an area more improvement may be made.

SUMMARY OF THE INVENTION

It is therefore an object of this invention to provide a hidden viewfinder that may be raised out of the camera body for use and may be hidden and nested in the camera body when not in use. The camera size thus may be made smaller size and becomes more convenient for users.

It is another object of this invention to provide a hidden viewfinder that may hold circuit boards or control elements in the viewfinder between the lenses so that the camera may have more function and features without increasing its size.

In one aspect, the hidden viewfinder of this invention includes a camera body, a plurality of lens frames and an outer frame. In the camera body, there are a pair of spaced channel slots. The bottom end of each lens frame is pivotally hinged between the channel slots and being engaged with a torsional spring. Each lens frame has a lens mounted therein. The outer frame is a reversed U-shaped tunnel type frame with a top wall and two side walls engageable with the two channel slots. The outer frame may be pressed downward to wedge into the channel slots when the camera is not in use to form a compact size. In that situation, the lens frames are pivotally pressed downward in flat positions about the bottom ends thereof. When in use, the outer frame may be raised and popped up above the camera body to form a tunnel like duct. The lens frames are raised upright by the torsional springs in the outer frame to form the viewfinder. Because of such structure, more circuit boards and control elements may be disposed at two lateral sides of the side-walls of the outer frame without obstructing the optical path of the viewfinder and without increasing the camera size.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
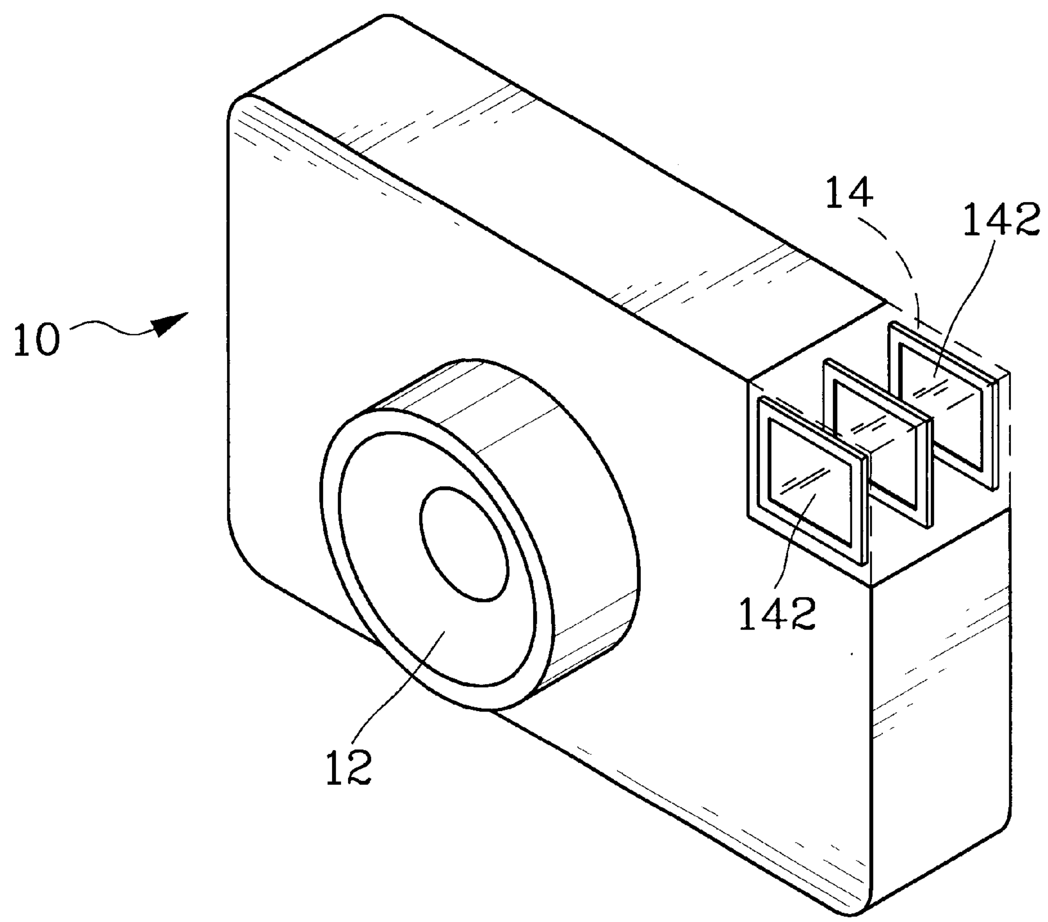
FIG. 1 is a schematic view of a conventional camera.
Figure 2:
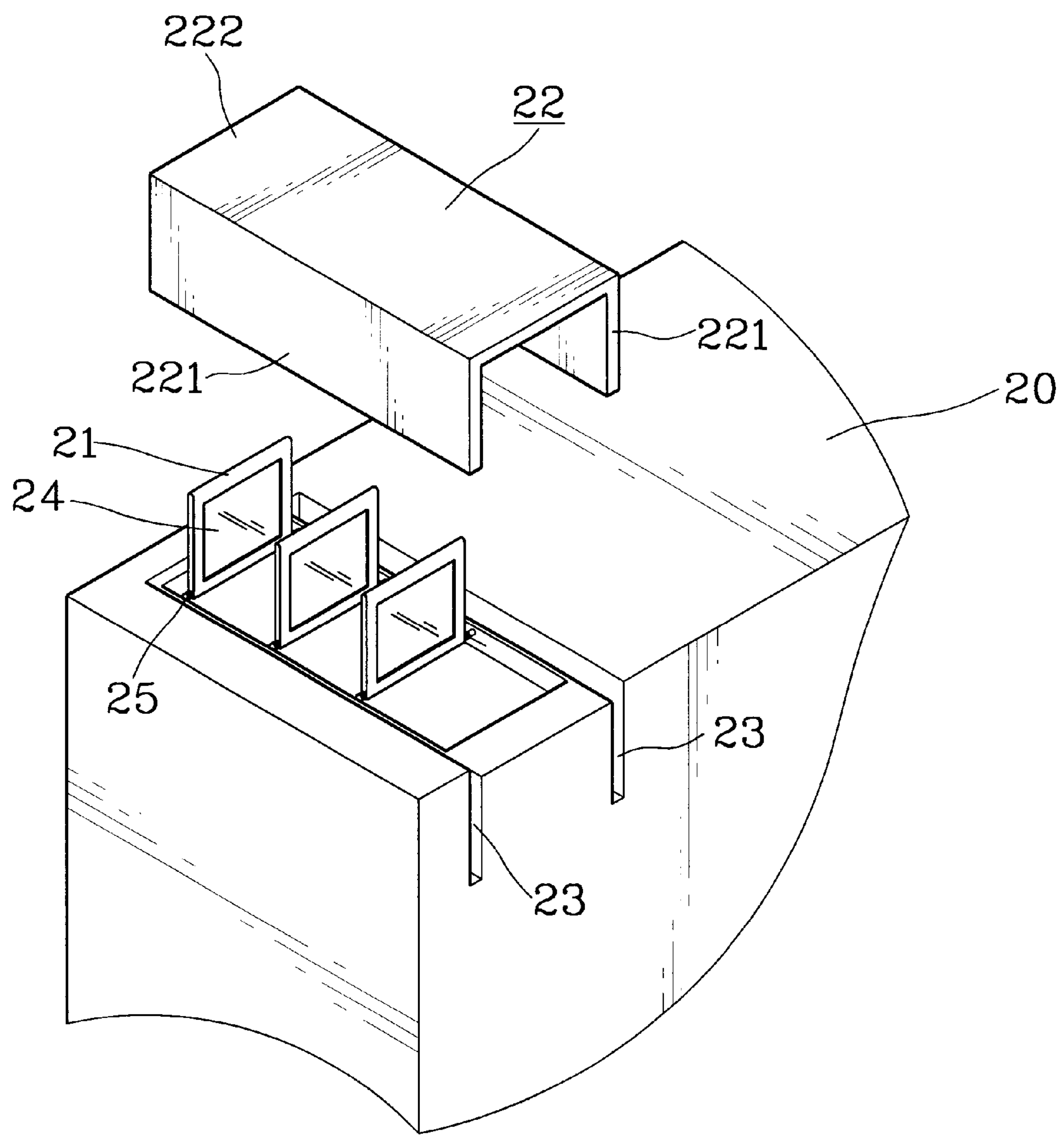
FIG. 2 is a first embodiment of this invention.

Referring to FIG. 2, for the first embodiment of this invention, the viewfinder includes a camera body 20, a plurality of lens frames 21 and an outer frame 22. In the camera body 20, there are a pair of spaced channel slots 23 formed in a location desired. The lens frames 21 are rectangular and have respectively a bottom end pivotally hinged on the camera body 20 between the two channel slots 23. Each of the lens frames 21 has a lens 24 mounted therein. The bottom end of each frame has a torsional spring 25 engaged therewith which may raise the lens frame to an upright position when there is no other external force. The outer frame 22 is a reversed U-shape tunnel type frame which includes a top wall 222 and two side walls 221 which may be wedged into the channel slots 23 by force.

Figure 3:
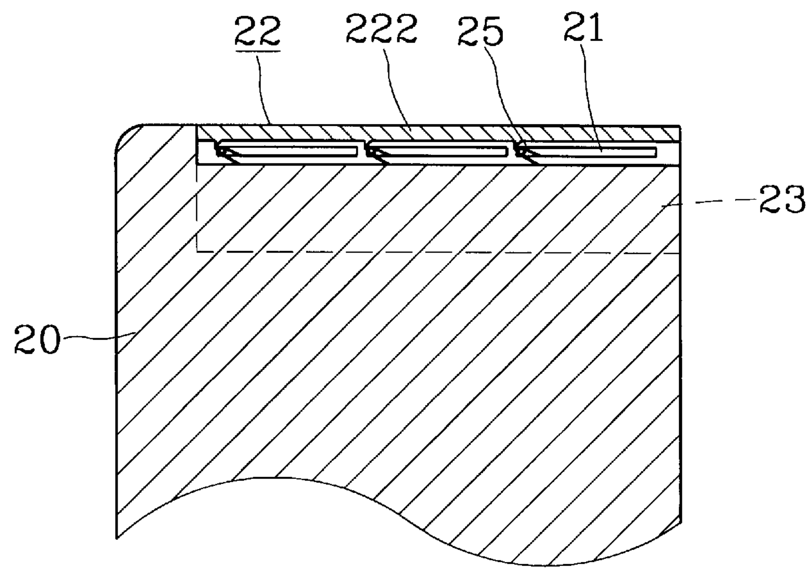
FIGS. 3A and 3B are schematic side views of the first embodiment in use.
Figure 3:
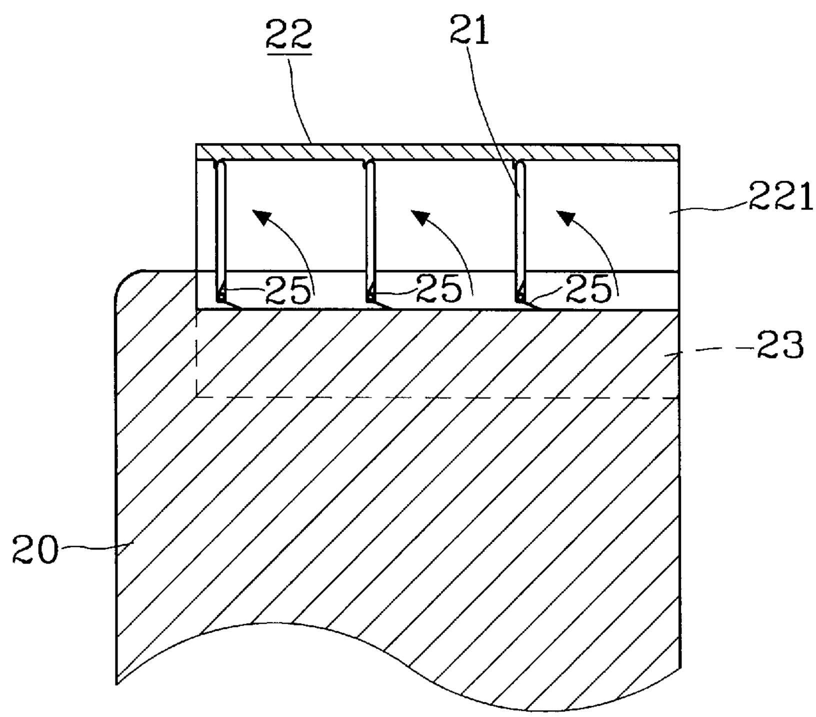

Referring to FIG. 3A, when the camera is not in use, the outer frame 22 is pressed downward into the camera body 20 with the side walls 221 housed in the channel slots 23. The top wall 222 presses the lens frames 21 turning about the bottom end thereof and laying flatly upon the camera body 20. It forms a compact size camera body. When in use, the outer frame 22 is popped upward (shown in FIG. 3B). The side walls 221 raise in the channel slots 23 to a height desired. The torsional springs 25 raises the lens frames 21 to upright positions inside the outer frame 22. It thus forms a viewfinder with a free optical path inside. The camera space between the two channel slots 23 may be used to hold circuit boards and other control elements desired to augment the camera function and features. This embodiment thus serves well the objects of enhancing the camera function without increasing the camera size.

Figure 4:
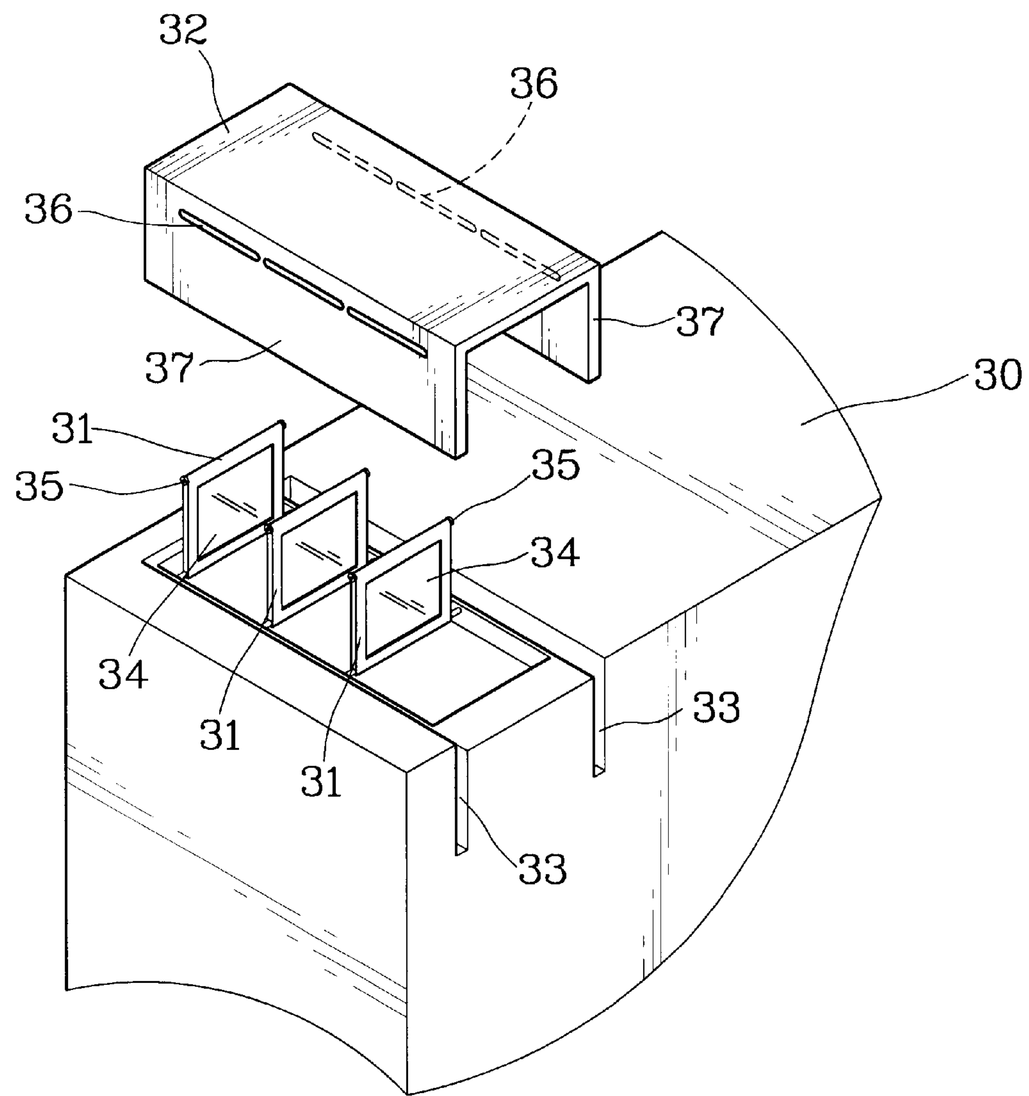
FIG. 4 is a second embodiment of this invention.

FIG. 4 illustrates a second embodiment of this invention. It is mostly constructed like the first embodiment shown in FIG. 2 and also includes a camera body 30, two channel slots 33, a plurality of hinged lens frames 31 with lenses 34 mounted therein, and an outer frame 32. However in the side walls 37 of the outer frame 32, there are rail slots 36 horizontally formed therein. At the end of each lens frame, there are rollers 35 pivotally held at two lateral sides engageable with the rail slots 36. The torsional springs are omitted.

Figure 5:
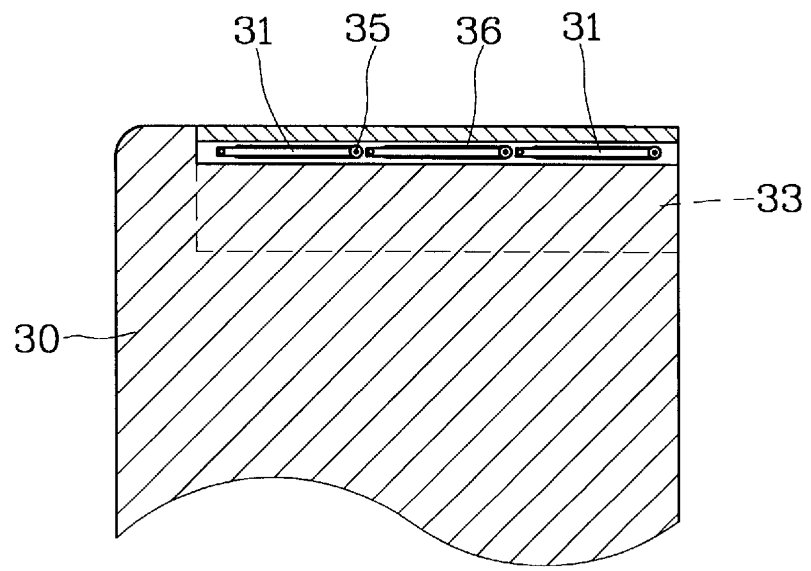
FIGS. 5A and 5B are schematic side views of the second embodiment in use.
Figure 5:
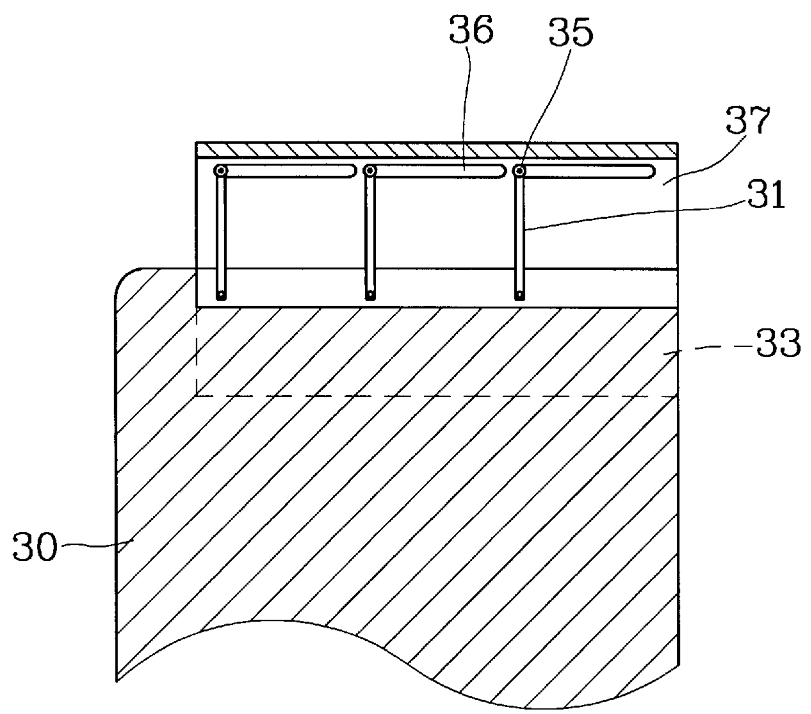

When the camera is not in use (shown in FIG. 5A), the outer frame 32 is pressed downward in the camera body 30. The rollers 35 slide in the rail slots 36 to one end thereof. The lens frames 31 are held in horizontal positions. When in use, the outer frame 32 is raised (shown in FIG. 5B). The rollers 35 are being actuated to slide to another end of the rail slots 36 so that the lens frames 31 will be held upright to form a viewfinder within the outer frame 32.

Figure 6:
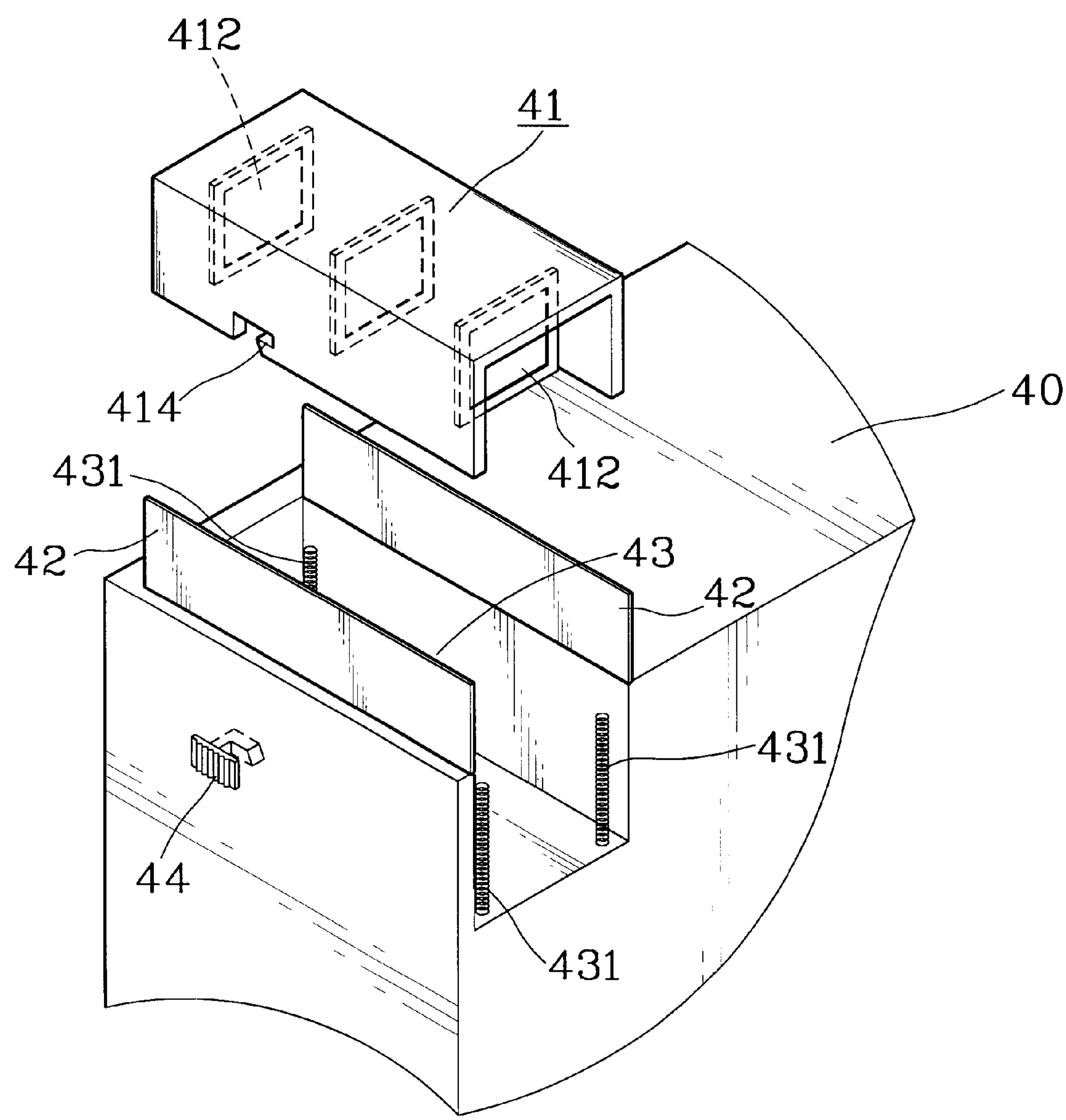
FIG. 6 is a third embodiment of this invention.

FIG. 6 shows a third embodiment of this invention. The viewfinder includes a camera body 40 which has a rectangular trough 43 formed therein at a selected location, a lens frame 41 and two mask plates 42 hinged respectively at two sides of a top opening of the trough 43. Besides the top opening, the trough 43 has a front opening. There are four springs 431 located at four corners of a bottom surface of the trough 43. In a lateral wall of the trough 43 bordering one side of the camera body 40, there is a slot opening in which a slidable hook 44 is disposed. The hook 44 has one end extended in the trough 43 while another end attached a push button located outside the camera body 40.

The lens frame 41 is a reversed U-shape tunnel type frame with a top wall and having a plurality of lenses 412 vertically mounted therein under the top wall. At a side wall of the lens frame 41 adjacent the slot opening, there is a crook 414 engageable with the hook 44.

Figure 7:
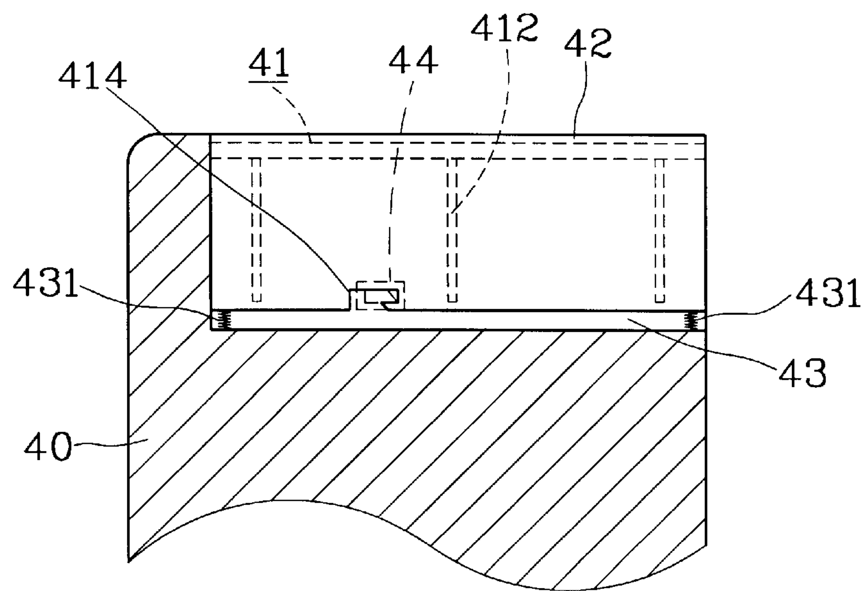
FIGS. 7A and 7B are schematic side views of the third embodiment in use.
Figure 7:
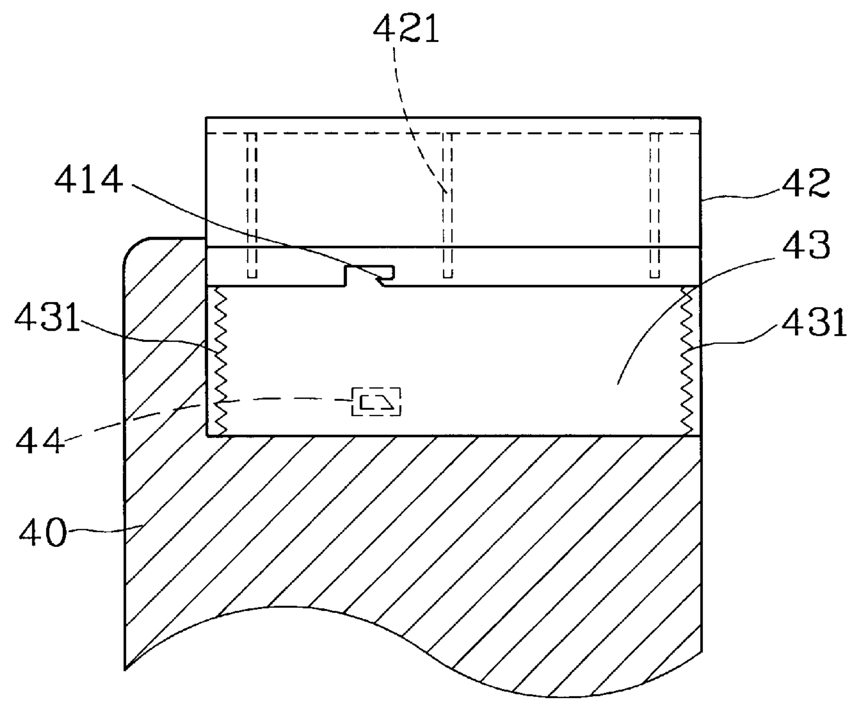

Referring to FIG. 7A, when this invention is not in use, the lens frame 41 is pressed down and held in the trough 43. The two side walls of the lens frame 41 press against the springs 431 and the crook 44 is engaged with the hook 44. The mask plates 42 are swung horizontally to cover the top opening of the trough 43 while the lens frame 41 is held in the trough 43. It forms a compact size camera. When in use, the hook 44 is pushed sideward to disengage with the crook 414. The springs 431 force the lens frame 41 upward which in turn pushes the mask plates 42 to swing open. The lens frame 41 then will be raised above the trough 43 (as shown in FIG. 7B) to from a viewfinder with a free optical path inside. The circuit boards and other control elements may be held in the trough 43. Hence the camera may be made small size but has rich function.

Figure 8:
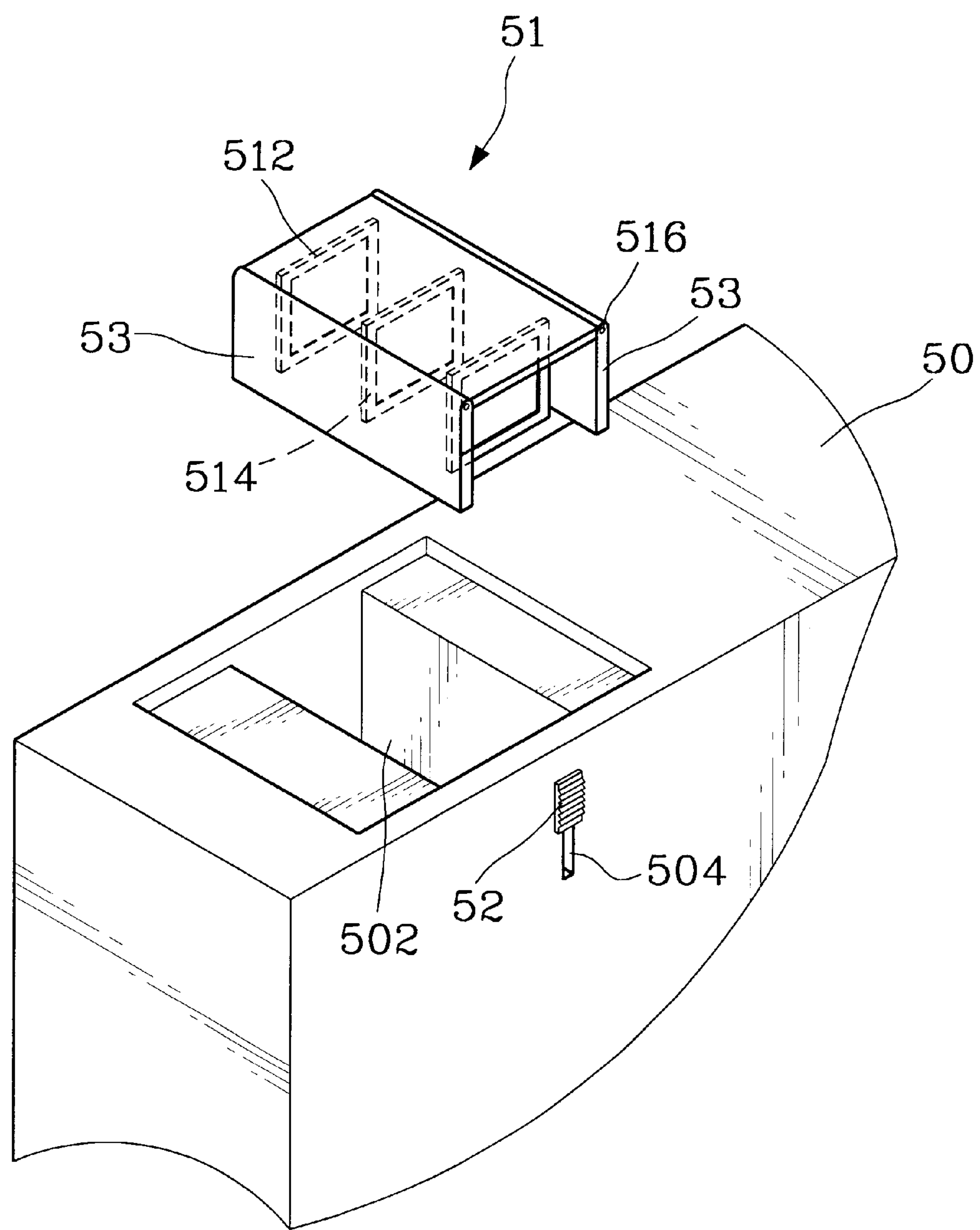
FIG. 8 is a fourth embodiment of this invention.

FIG. 8 illustrates a fourth embodiment of this invention. It is to some degree constructed like the one shown in FIG. 6. In the camera body 50, there is a trough 502 which has a top opening and two step surfaces extending sideward of the top opening. The trough 502 has two closed ends bordered with the camera body 50. At one end of the trough 502, there is a slot opening 504. There is a slide button 52 movable up or down in the slot opening 504. A lens frame 51 is provided with a plurality of lens 514 vertically mounted under a top wall 512. The bottom end of the lens 514 may contact with the slide button 52. The two side edges of two top wall 512 form two pivotal joints 516 hinged respectively with two wing plates 53.

Figure 9:
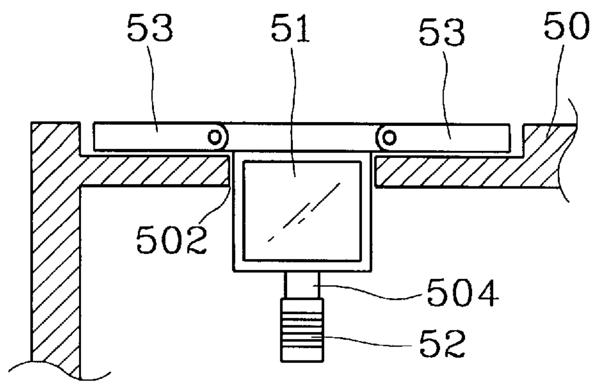
FIGS. 9A–C are schematic side views of the fourth embodiment of this invention in use.
Figure 9:
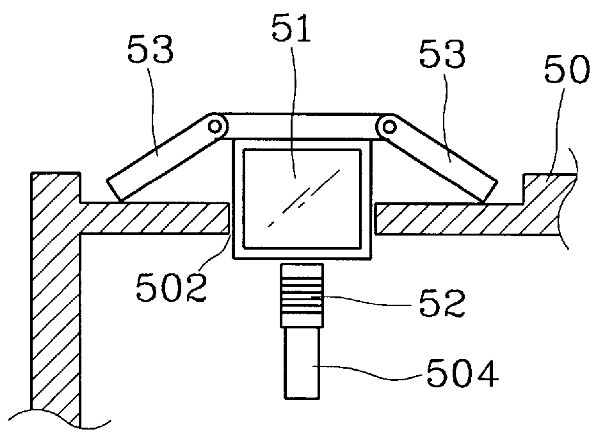
Figure 9:
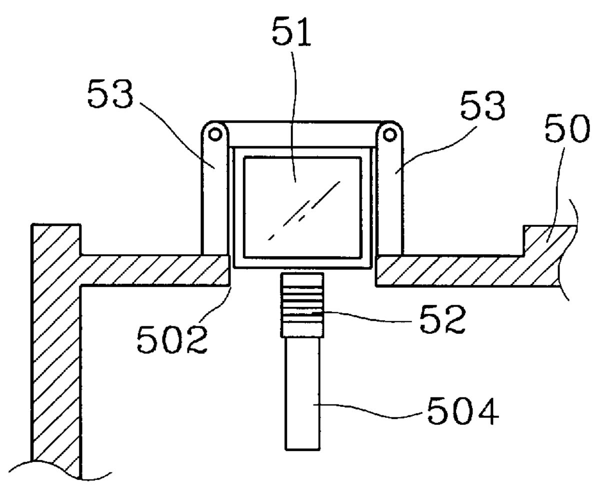

Referring to FIG. 9A, when this invention is not in use, the slide button 52 is moved down to the bottom of the slot opening 504. The lens frame 51 is housed in the trough 502. The two wing plates 53 are swung sideward and rest on the step surfaces. It forms a neat and compact camera body. When in use, the slide button 52 is pushed upward which pushes the lens 514, consequently the lens frame 51 upward (as shown in FIG. 9B) until the slide button 52 is moved to the upmost position (FIG. 9C). At this position, the wing plates 53 will swing to vertical positions to form a tunnel type frame with the top wall and serve as a viewfinder for the camera with a free optical path. The circuit boards and other control elements may be held in the trough 502. Hence the camera may be made is compact size but rich in function.

It may thus be seen that the objects of the present invention set forth herein, as well as those made apparent from the foregoing description, are efficiently attained. While the preferred embodiments of the invention have been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A hidden viewfinder for a camera, comprising:

a camera body having a pair of spaced channel slots located at one side of the camera body;

a plurality of lens frames each having a bottom end pivotally connected with the camera body between the channel slots and each having a torsional spring engaged with the bottom end; and an inverted U-shaped tunnel type outer frame having a top wall and two side walls engageable with the channel slots, the outer frame contacting the plurality of lens frames;

wherein when the camera is not in use, the outer frame is pressed down such that the side walls engage the channel slots and the top wall pivots the lens frames about the bottom ends such that the lens frames lay horizontally on the camera body;

wherein when the camera is in use, the outer frame is raised above the camera body and the lens frame are raised upright by the torsional spring to form the viewfinder in the outer frame.

2. The hidden viewfinder of claim 1 further comprising circuit boards and control elements located in the camera body between the channel slots.

3. The hidden viewfinder of claim 1, wherein each lens frame has a lens mounted therein.

4. The hidden viewfinder of claim 1, wherein the lens frames are rectangular.

5. A hidden viewfinder for a camera, comprising:

a camera body having a pair of spaced channel slots located at one side of the camera body;

a plurality of lens frames each having a bottom end pivotally connected with the camera body between the channel slots and each having a pair of rollers located at a top end thereof; and an inverted U-shaped tunnel type outer frame having a top wall and two side walls, each side wall having a plurality of horizontal rail slots formed therein, the rail slots being engaged by the rollers;

wherein when the camera is not in use, the outer frame is pressed down such that the side walls engage the channel slots and the rollers slide to one end of the rail slots to enable the lens frames to be pivoted to horizontal positions; wherein when the camera is in use, the outer frame is raised above the camera body and the rollers slide to another end of the rail slots to raise the lens frames upright to form the viewfinder in the outer frame.

6. The hidden viewfinder of claim 5 further comprising circuit boards and control elements located in the camera body between the channel slots.

7. The hidden viewfinder of claim 5, wherein each lens frames has a lens mounted therein.

8. The hidden viewfinder of claim 5, wherein the lens frames are rectangular.

* * * * *